Feb. 12, 1929. 1,701,905
A. ANDERBERG ET AL
CONTROL VALVE FOR COMPRESSED AIR BRAKES
Filed Oct. 17, 1927 2 Sheets-Sheet 1
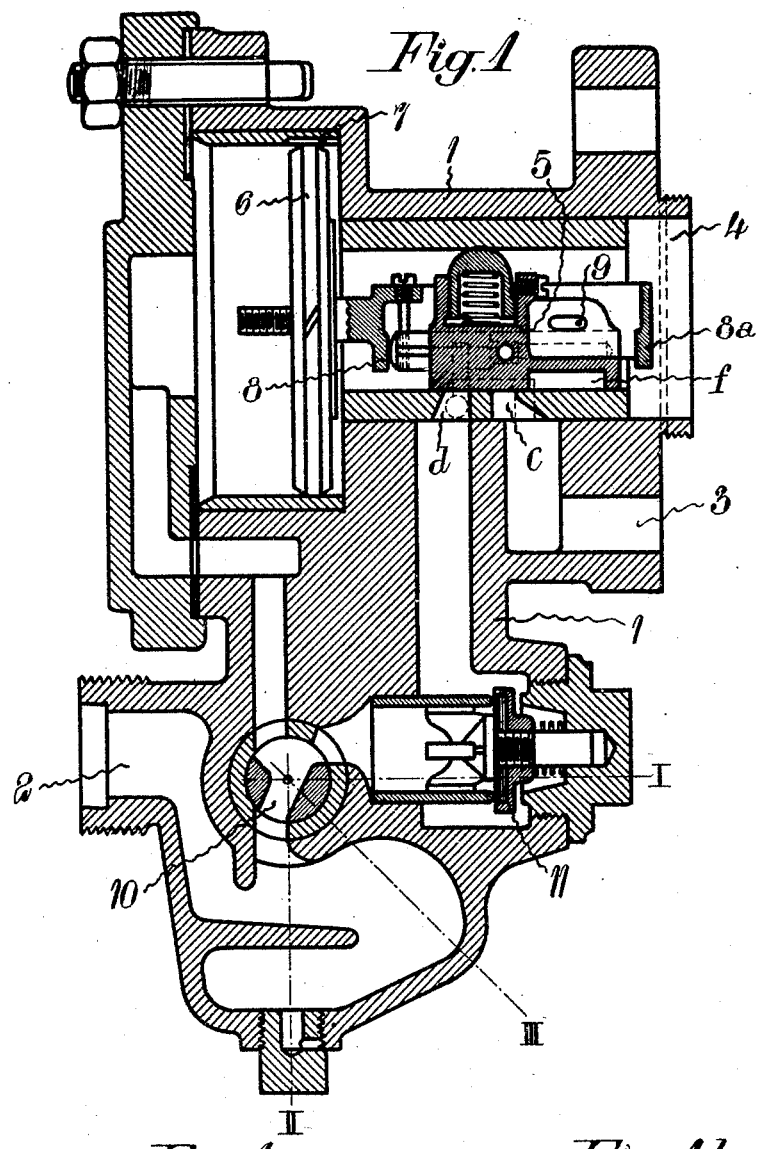
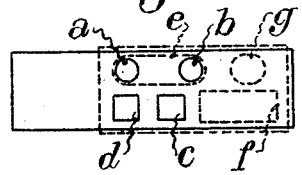
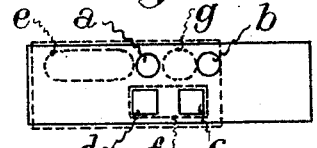
Inventors:
Anders Anderberg
and Erik Anders Anderberg
By [signature]
Attorney

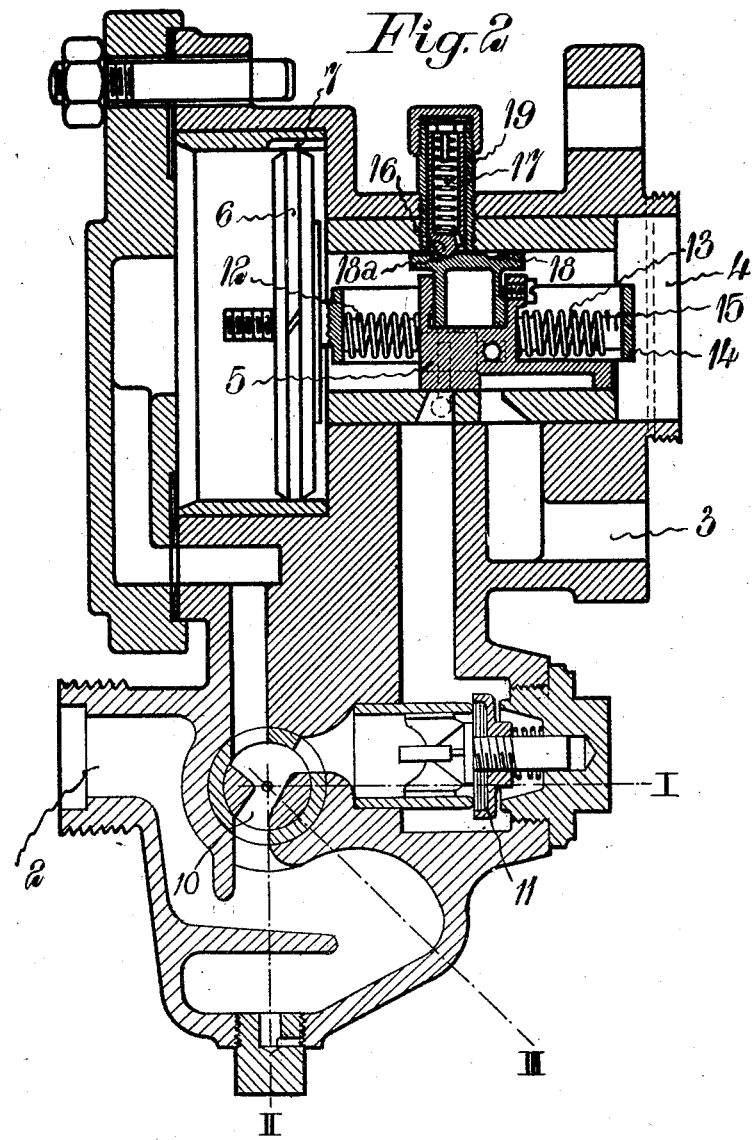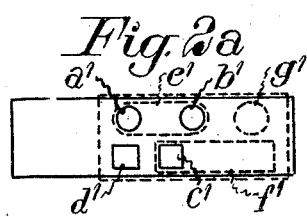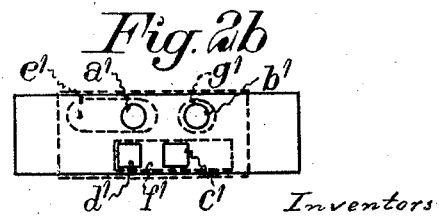

Patented Feb. 12, 1929.

1,701,905

UNITED STATES PATENT OFFICE.

ANDERS ANDERBERG AND ERIK ANDERS ANDERBERG, OF MALMO, SWEDEN.

CONTROL VALVE FOR COMPRESSED AIR BRAKES.

Application filed October 17, 1927, Serial No. 226,735, and in Sweden September 23, 1927.

Single-chamber compressed air brakes are still in common use and it is often desired to replace the same by newer and more modern brake systems, which lately have been more and more adopted, and in which a two-chamber air brake or a modification thereof is included. It is also desirable of course that the substitution referred to be effected with so small a change of parts as possible, or in other words in such a manner that details at hand in connection with the single-chamber brakes be used to the greatest possible extent in connection with the brake system of other kind intended to replace the former, in order to minimize the costs for the alteration as far as possible.

As far as pipings, air reservoirs, couplings, stop valves and the like are concerned, the substitution may be effected with little or no change in their mounting on the rolling stock, but there is a rather costly device commonly used in connection with brake systems which cannot be transferred directly from one brake system to another, this device being the control valve or triple valve.

In the case of two-chamber air brakes or combined brakes of long-known types, it is not possible to alter the control valve in such a way as to adapt it for use in connection with the new brake system, if the single-chamber brakes previously at hand are to be replaced by such brakes; so that the control valve at hand must be replaced by another control valve far more complicated and costly. On the other hand, if the brakes at hand, i. e. the single-chamber brakes, are replaced by the combined brake referred to in our prior Patent No. 1,663,579, granted March 27, 1928, or another simple or combined brake system, which for its operation requires an arrested controlling member, it will be possible merely by a slight modification of the control valve already at hand to adapt the same for use in the new and substituting brake system, this modification as a whole being so simple, that its cost will be only a small fraction of the cost of a completely new control valve, especially if the same must be of such a complicated nature as is required in connection with the older combined brake systems.

Thus, the present invention is mainly intended for use in connection with such modified two-chamber brakes as are described in our said patent; but it is not to be understood that the invention cannot be applied with the same advantages to other brake systems, on condition, however, that the latter to perform their function require an arrested controlling member.

For the purpose of adapting a common control valve or triple valve, as used for single-chamber brakes, for use in connection with two-chamber brakes such as disclosed in our patent or the like construction, it is only necessary according to the invention to combine the common slide that serves as a control member with releasable means for arresting said slide in both of its end positions and to arrange a flexible connection between the same and its actuating piston in such a manner that the slide cannot take any other position than either of the end positions.

These slight modifications in the construction of commonly used control valves for single-chamber brakes may be effected at a very small expense by means of a slight alteration of the slide and the provision of an additional arresting means, which may easily be mounted on the valve.

In order to give a full explanation regarding the modifications required, the accompanying drawings, illustrating the invention, show in Fig. 1 a commonly known type of control valve for single-chamber brakes seen in vertical section, and Fig. 2 in the same manner shows the same valve modified according to the invention. The valve shown in Fig. 1 (with minor modifications having no influence at all on the principle of operation) is now used in all of the known single-chamber brake systems and it may thus, at least in the parts having any connection with the invention, be considered as characteristic of all single-chamber brake systems, even if the constructional parts may differ a little in different cases. Figs. 1ª and 1ᵇ show diagrams of the slide ports and cavities, and the corresponding ports or openings in the surface whereon the slide travels, which latter ports coact with the former, and Figs. 2ª and 2ᵇ in the same manner show the same features modified according to the invention. At first sight it will be evident from the drawings that the differences are not great, although they are very important to the operation.

Irrespective of the manner in which the control valve is built, it consists always of a valve housing 1 provided with three connection bosses, i. e. one boss 2 for connection to the brake pipe running along the whole train, another boss 3 for connection to the brake cylinder (single-chamber brakes have one cylinder chamber only) and a third boss 4 for connection to the auxiliary air reservoir. Furthermore the control valve is always provided with a slide valve 5 intended for effecting a connection either between the brake pipe and the brake cylinder, i. e. between the bosses 2 and 3, or between the auxiliary air reservoir and the brake cylinder, i. e. between the bosses 3 and 4, this slide valve being actuated by a control piston 6. One side of this piston is acted on by the pressure within the brake pipe (the boss 2) and the other side is acted on by the pressure within the auxiliary air reservoir (the boss 4), and the piston coacts with a feed groove 7 and in connection with the same serves as a valve between the brake pipe and the auxiliary air reservoir, said valve being open when the brakes are released. The slide 5, which has a lost motion corresponding to a travel of the piston 6 for a distance sufficient to close the feed groove 7, is connected with the piston rod and it is acted on by abutments 8 and 8$^a$ or a pin 9 in an elongated slot when the limits for the lost motion are reached. The said actuating means are removed according to the invention and they are replaced by springs between the slide and the piston rod as more fully explained below.

The known control valve, as well as all modern control valves of this type, according to Fig. 1 is also combined with a cock 10 which may be turned into three different positions, of which:

Position I is for ordinary braking or single action, whereby compressed air from the auxiliary reservoir may be introduced into the brake cylinder by means of the slide 5.

Position II is for quick action or emergency braking, whereby the pressure in the brake pipe may also be introduced directly into the brake cylinder by unseating the non-return valve 11, and Position III is a cut off or closed position, wherein the control valve as a whole, by closing of the cock 10, is completely cut off so that the brakes are set out of action.

The position of the cock 10 shown in the drawings corresponds to position II as described above, and the function of the control valve is so well known that it seems unnecessary to explain it more fully in this connection.

According to the invention the actuating means between the piston rod and the slide are removed as aforesaid, and they are replaced by springs 12 and 13, the spring 12 being inserted between the slide and the piston 6 and the spring 13 between the slide and an abutment 14 arranged on the piston rod. Also in this case an interspace 15 is produced which permits the piston to move a certain distance before compressing the spring 14 and the lost motion thus obtained likewise corresponds to a closing of the feed groove 7.

The slide 5 is releasably arrested in both of its end positions, and in the construction shown in the drawing the arresting means consists of a pin 16 having a spherical head acted upon by a spring 17 which presses it against the slide for coaction with corresponding recesses 18 and 18$^a$ arranged in said slide. The arresting means as a whole is enclosed within a tube-like housing 19 and as a single unit it may be screwed into a hole through that part of the valve housing surrounding the slide. Hence it will be evident that this constructional detail may easily be arranged on the valve housing and, moreover, that the alterations needed are limited to a slight modification of the slide as will at once be seen when comparing Figs. 1 and 2, the alteration mainly affecting that part of the slide otherwise used for obtaining a resilient contact pressure between the slide and the surface whereon it rests.

It will be obvious that if anyone, instead of altering a slide already at hand in the manner described above and shown in the drawings, should prefer to produce a completely new slide constructed according to the invention, an alteration of such a kind is also included in the invention. In such case the difference between the new slide and the old one may perhaps be a little greater than the differences shown in the drawings, but the difference in cost for the alteration is small and without importance.

The recess 18, corresponding to a brake position of the valve, may be a little deeper than the recess 18$^a$ corresponding to the release position in order to make the arresting force a little stronger in the former position than in the latter, whence it results that the difference in pressure for operating the brakes need not be so great as the difference in pressure for releasing them.

When the control valve is used, either of the springs 12 or 13 must of course be compressed to a degree sufficient for releasing the arresting means before the slide moves at all, and this function will cause the slide to move rapidly and accurately, so that it is thus prevented from taking any intermediate position between the two end positions.

It is obvious that the arresting means need not of necessity be constructed in the form described above, but may vary considerably the main point being simply that a releasable arresting operation occurs in both of the end positions of the slide.

In Figs. 1$^a$ and 1$^b$ the full lines show the outline and the ports of the supporting surface or seat for the slide valve, and the ports and cavities in the slide are shown in dotted lines. In order to permit the slide to act in the manner desired according to Fig. 1 it should be able to take three different positions, the position shown in Fig. 1ª being the rightmost end position corresponding to released brakes, and the position shown in Fig. 1ᵇ being the leftmost end position corresponding to a quick-action braking. The third position is an intermediate one, corresponding to single-action braking, but needs not be explained, since it has no place in the invention. In the supporting surface (full lines) four ports are provided, viz, port *a* which leads to the atmosphere, port *b* which leads to the brake cylinder, port *c* also leading to the brake cylinder and port *d* which leads to the brake pipe. In the slide proper (dotted lines) two channels or cavities are provided, viz, channel *e* coacting with the ports *a* and *b*, and channel *f* coacting with the ports *c* and *d*. The slide is also provided with a third channel *g* which is formed through the slide and communicates with the chamber surrounding the same, i. e. with the auxiliary air reservoir, and by means of the feed groove 7 also communicates with the brake pipe.

Now, on considering Fig. 1ª, it will be seen that the slide takes a position for inter-connection of the ports *a* and *b* by means of the channel *e*, whereby the brake cylinder is connected to the atmosphere and the slide position thus corresponds to a release position of the brakes. If the slide, by decrease of pressure in the brake pipe, is pushed to the position shown in Fig. 1ᵇ the cavity *f* will connect the ports *c* and *d*, whereby the brake pipe is directly connected (by the non-return valve 11) to the brake cylinder, the position thus corresponding to a quick-action braking. Furthermore, the slide valve may take the third position referred to above, wherein the port *g* coincides with the port *b*, and then the brake cylinder, for the purpose of single-action braking, is connected with the auxiliary air reservoir. This third position is not present in the modified construction and the slide can only take either of the end positions, but nevertheless the single-action braking may also be effected according to the invention, as will be explained below.

In order to permit the slide to take a position both for single-action and for quick-action braking the channel *f*¹ in Figs. 2ª and 2ᵇ, which corresponds to the channel *f* in Figs. 1ª and 1ᵇ, is somewhat elongated (to the left in the drawings) so that in the end position in Fig. 2ᵇ, which corresponds to a braking of one kind or another, it will always connect the ports *d*¹ and *c*¹ (corresponding to *d* and *c* in Figs. 1ª and 1ᵇ), so that it will depend on the position of the cock 10 whether the single-action or the quick-action will take place. Beyond this small modification (elongation of the channel *f*) all of the channels and ports both in the slide itself and in its supporting surface or seat are the same as described in connection with Figs. 1ª and 1ᵇ, and the same reference numerals are used on corresponding parts with the only difference that the numerals in Figs. 2ª and 2ᵇ are primed.

It will be obvious that the elongation of the channel *f* described above in connection with the invention is to be used only when altering an old slide, but if the old slide is replaced by a new one, such an elongation of the channel need not be effected since the channel *f* may be displaced only (to the left) a distance sufficient for obtaining the desired connection between the ports *c* and *d*, as otherwise the channel *f*, if elongated, would have an unnecessary length which is not required for the function.

From the foregoing it will thus be understood that the control valve, in spite of the alterations according to the invention and of the fact that the slide can take two positions only instead of three as previously, will not have any restricted function, and that it may be used as well for single-action braking and for quick-action braking as for cutting off the brakes as a whole in the same manner as before and simply by means of a turning movement of the cock 10.

What we claim and desire to secure by Letters Patent is:—

1. A control valve for single-chamber compressed air brakes, comprising a casing, having means for connecting its interior with a main brake pipe, a brake cylinder and an auxiliary air reservoir; a slide for establishing inter-connection between the brake pipe, the brake cylinder and the air reservoir, a piston for controlling the movements of the slide subjected at one side to the air pressure in the brake pipe and at the other side to the air pressure in the reservoir; a lost-motion transmission connection between the piston and the slide; and means for arresting the slide in either of its two end positions, one of which corresponds to brake-release and connects the brake cylinder with atmosphere, while the other corresponds to brake-setting and connects the brake cylinder simultaneously with the air reservoir and the brake pipe.

2. A control valve, according to claim 1, in which the valve casing is provided with an internal passage for connecting the brake pipe and brake cylinder; and in which a three-way cock is rotatably mounted in such passage to close the same at will irrespective of the position of the slide and of the connection between the air reservoir and the brake cylinder.

3. A control valve for single-chamber compressed air brakes, comprising a casing, having means for connecting its interior with a main brake pipe, a brake cylinder and an auxiliary air reservoir; a slide for establishing inter-connection between the brake pipe, the brake cylinder and the air reservoir; a piston for controlling the movements of the slide subjected at one side to the air pressure in the brake pipe and at the other side to the air pressure in the reservoir; spring transmission connections between the piston and the slide and enabling a lost-motion movement of the former; and means for arresting the slide in either of its two end positions, one of which corresponds to brake-release and connects the brake cylinder with atmosphere, while the other corresponds to brake-setting and connects the brake cylinder simultaneously with the air reservoir and the brake pipe.

4. A control valve for single-chamber compressed air brakes, comprising a casing, having means for connecting its interior with a main brake pipe, a brake cylinder and an auxiliary air reservoir; a slide for establishing inter-connnection between the brake pipe, the brake cylinder and the air reservoir; a piston for controlling the movements of the slide subjected at one side to the air pressure in the brake pipe and at the other side to the air pressure in the reservoir; a lost-motion transmission connection between the piston and the slide; and a spring-loaded device for arresting the slide in either of its two end positions, one of which corresponds to brake-release and connects the brake cylinder with atmosphere, while the other corresponds to brake-setting and connects the brake cylinder simultaneously with the air reservoir and the brake pipe.

5. A control valve for single-chamber compressed air brakes, comprising a casing, having means for connecting its interior with a main brake pipe, a brake cylinder and an auxiliary air reservoir; a slide for establishing inter-connection between the brake pipe, the brake cylinder and the air reservoir; a piston for controlling the movements of the slide subjected at one side to the air pressure in the brake pipe and at the other side to the air pressure in the reservoir; spring transmission connections between the piston and the slide and enabling a lost-motion movement of the former; and a spring-loaded device for arresting the slide in either of its two end positions, one of which corresponds to brake-release and connects the brake cylinder with atmosphere, while the other corresponds to brake-setting and connects the brake cylinder simultaneously with the air reservoir and the brake pipe.

In testimony whereof we have signed our names to this specification.

ANDERS ANDERBERG.
ERIK ANDERS ANDERBERG.